Sept. 24, 1940.  W. D. NELSON  2,215,592
RAKE
Filed Sept. 28, 1938
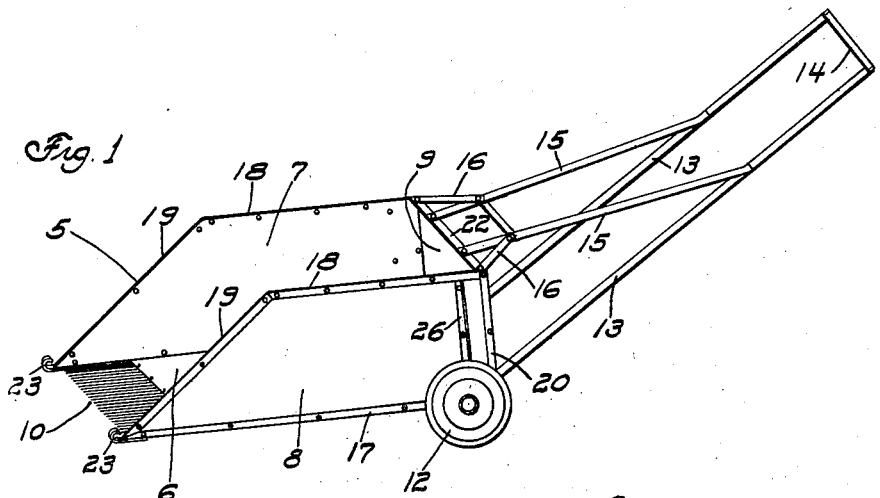
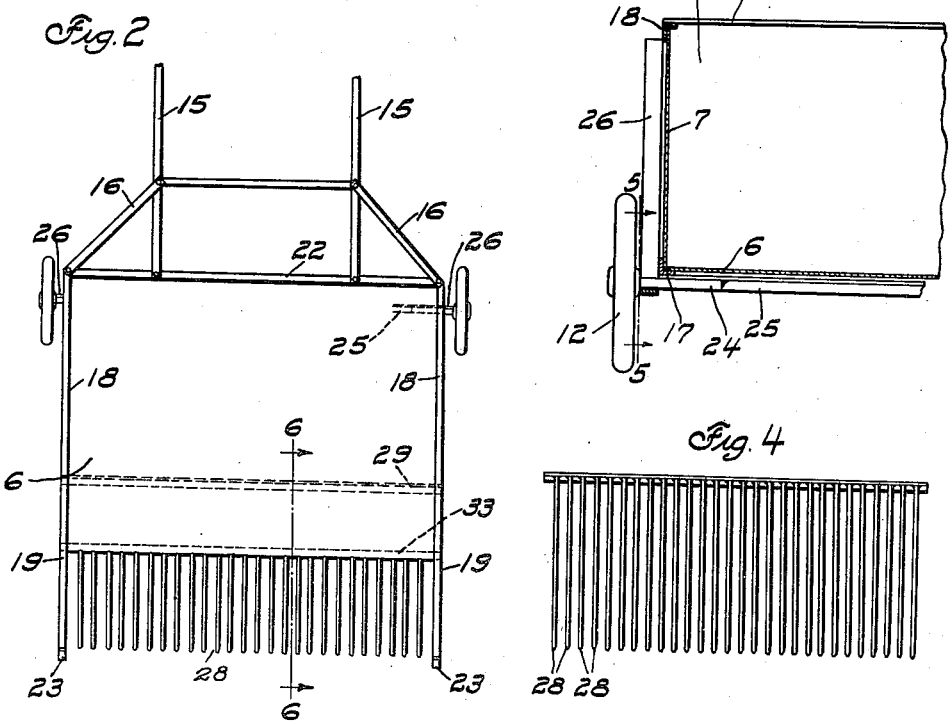
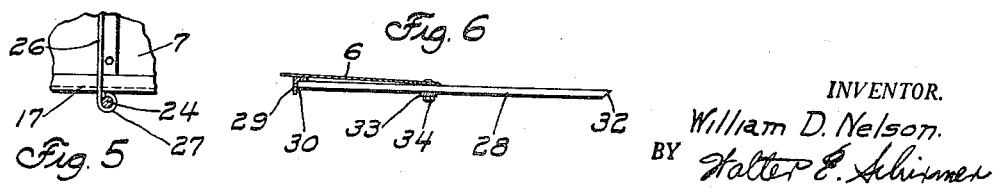
INVENTOR.
William D. Nelson.
BY Walter E. Schirmer
ATTORNEYS.

Patented Sept. 24, 1940

2,215,592

UNITED STATES PATENT OFFICE 2,215,592

RAKE

William D. Nelson, Buchanan, Mich.

Application September 28, 1938, Serial No. 232,054

4 Claims. (Cl. 56—400.13)

This invention relates to rakes, and more particularly is directed to a hand operated rake construction for use in picking up leaves and other debris from lawns and the like.

One of the primary objects of the present invention is to provide a wheeled implement having a comb like arrangement at the forward edge thereof adapted to be guided over a lawn or similar plot of ground for picking up leaves, stones and other debris which may be scattered thereover, the forward movement of the implement forcing the debris rearwardly into a compartment or the like. The implement is adapted to be pushed by hand and guided over the particular plot of ground, and at its forward edge is preferably provided with a pair of shoe members which serve to prevent the forward end of the implement from gouging into the sod. These shoes are also of appreciable utility in that the entire implement may be rocked thereabout when it is desired to empty the same.

Another feature of the present invention is the provision of an implement of this type made up entirely of sheet metal parts, such as angle irons, tin plate, and flat metal strips which can be easily assembled, and is sufficiently rigid to withstand an appreciable amount of abuse without losing its operating characteristics.

Another feature of the present invention is the construction of an axle for supporting the wheels of the implement formed from angle iron and round studs or shafts welded to the iron.

Still another feature of the present invention is the provision of a novel type of support for the axle formed from angle iron.

It is essential in an implement of this type that the comb or rake portion of the device be such as to effect the proper picking up of the debris and yet not be subject to damage when encountering rough spots in the ground or large heavy obstacles. For this reason the comb of the present device is preferably formed of relatively sturdy round bars which are welded to a supporting plate and securely mounted at the forward portion of the implement.

Other objects and advantages of the invention will be more apparent from the following detailed description, which, taken in conjunction with the accompanying drawing, will disclose to those skilled in the art the particular construction and operation of a preferred form of the present invention.

In the drawing:

Figure 1 is a perspective view of the preferred embodiment of the invention;

Figure 2 is a top plan view, with certain portions broken away, of the structure shown in Figure 1;

Figure 3 is a partial sectional view through the axle shaft mounting on an enlarged scale;

Figure 4 is a detailed bottom plan view of the comb;

Figure 5 is an enlarged fragmentary detail view taken substantially on line 5—5 of Figure 3; and Figure 6 is an enlarged fragmentary sectional view taken substantially on line 6—6 of Figure 2.

Referring now in detail to the drawing, the implement comprises a body section indicated generally at 5, comprising a floor 6, side walls 7 and 8, and a rear wall 9. The side walls 7 and 8 taper downwardly at their forward ends, and supported therebetween is a comb or rake assembly indicated generally at 10. Substantially at the rear portion of the body 5 is a pair of wheels 12 which are adapted to support the implement, and are mounted on roller bearings or the like to facilitate movement. Extending rearwardly from the rear wall 9 of the body are a pair of upwardly extending posts or arms 13 which, at their upper ends, are united by a cross member or handle 14.

Suitable brace members 15 are provided connected between the top of the rear wall 9 and an intermediate portion of the arms 13. In order to provide sufficient rigidity for the handle construction to facilitate turning of the implement, cross brace struts 16 are also provided to provide diagonal compression members for transmitting angular stresses to the implement. Preferably, although not necessarily, the arms 13 are of angle iron or the like, while the cross bar member 14 may be a wooden handle or any other suitable type of handle structure. The braces 15 and 16 are preferably flat iron strips.

The body of the implement is provided with a frame work composed of angle iron sections, the supports between the floor 6 and the side walls 7 and 8 comprising angle irons 17, while the top of the walls 7 and 8 are defined by angle irons 18 and 19, the angle irons 19 extending forwardly and downwardly and joining the angle irons 17 at the forward ends thereof. The corner supports between the side walls 7 and 8 and the rear wall 9 are also formed of angle irons 20, and preferably, the top and bottom of the wall 9 are defined by angle members 22. While the frame work is shown as being of angle irons, it is to be understood of course that any other structural members may be employed for this purpose. However, I have found that angle iron is a relatively cheap and effective frame supporting member, and lends itself admirably for the provision of sheet metal panels for forming the portions 6, 7, 8 and 9 of the body. These portions being formed of sheet metal may be readily joined and supported in the frame composed of the angle irons by means of small bolts, rivets or the like, whereby the sheet metal sides and end wall of the frame and the floor may be secured to the flanges of the angle irons. In place of sheet metal for forming the portions 6, 7, 8 and 9, it is also possible to apply ply wood, wall board, heavy canvas, or similar material for this purpose, and the invention is not to be limited to the use only of angle irons or sheet metal members for forming the body of the implement, but only as defined by the claims appended hereto.

At the junctions between the frame members 19 and 17, flat metal strips 23 are provided which are rolled at their forward ends into the form of shoes or the like, and which serve as a means for spacing the comb 10 slightly above the ground level, and also serve as rocker means whereby the entire implement may be rotated about the shoes 23 in order to empty the same. The shoes 23 also serve to guide the forward end of the implement over rough or uneven ground, or to prevent it from dropping down into such a position such that the teeth of the comb might be damaged.

The wheels 12 are preferably wheels of the type commonly used on coaster wagons and similar devices, and preferably have roller bearings therein for rotatably supporting the wheels on short round stub shafts 24. These shafts 24 in turn are welded in the angle portion of a transversely extending angle member 25 disposed below the floor 6 of the vehicle adjacent the rear end thereof. The stub shafts 24 are supported against movement with respect to the body of the implement by means of an angle member 26 secured to each of the side walls 7 and 8, and having its flange cut away at the top of the lower frame member 17 with the depending portion of the member 26 being rolled around the stub shaft 24 as indicated at 27 in Figure 5. This forms a rigid support for the axle shaft and maintains the wheels in proper position for operation of the implement.

Considering now the construction of the comb 10, this comb is formed of a plurality of parallelly extending laterally spaced rods 28 which, at their rear ends are securely positioned relative to a transversely extending angle member 29 by being welded thereto as indicated at 30. The forward ends of the rods or teeth 28 forming the comb are beveled upwardly at an angle of substantially 45° as indicated at 32 to facilitate their movement over the ground. Intermediate the support of the members 28 at the transverse angle member 29 extending beneath the floor 6 of the implement and the forward ends thereof is a cross member 33 which may be a strip having suitable recesses therein for locating the teeth 28 in parallel alignment, and which is bolted or otherwise suitably secured as indicated at 34 to the lower edge of the floor 6. With this construction the comb teeth 28 are rigidly maintained in alignment substantially parallel with the slope of the floor 6, and project therefrom a distance such as to effectively pick up leaves, small stones, and other debris without being sufficiently flexible as to be bent or to be damaged to any appreciable extent by contact with heavier obstacles. Also, the shoes 23 serve to space the forward ends of the teeth 28 slightly above the ground in such manner as to prevent their contact with the sod.

It is therefore believed apparent that the present construction provides an implement which will facilitate the cleaning of lawns and the like, and which is relatively simple in design and formed of parts that may be readily assembled without any necessity of machining or other labor thereon. Thus a very economical but sturdy device is produced at small cost. The width of the body 5 may be varied as desired, depending upon the type of lawn to be cleaned and also upon the weight of the structure. I find that for practical purposes a width of from two to three feet is most desired with the length of the body being approximately three feet and having a height of one foot from the floor level. Of course these dimensions may be varied without in any way departing from the underlying principles of the present invention, and I therefore do not intend to be limited except as defined by the scope and spirit of the appended claims.

I claim:

1. In combination, in a lawn rake, a two-wheeled box-like body having an open top and open end, the wheels being remote from said end, forwardly projecting rake teeth at said end, and shoe means on opposite sides of said body projecting forwardly of the rake teeth and laterally spaced therefrom, said shoe means comprising arcuate strips having bottom portions disposed below the plane of said teeth for supporting the forward end of said teeth in spaced relation to the ground.

2. In combination, in a lawn rake, a two-wheeled box-like body having a floor, an open top and open end, the wheels being remote from said end, forwardly projecting rake teeth at said end mounted in a common plane slightly inclined upwardly with respect to said floor, and shoe means on opposite sides of said teeth secured to the sides of said body forwardly of the teeth for maintaining the forward end of said teeth in spaced relation to the ground, said shoes having rolled portions for supporting the rake when the rear end thereof is raised to empty the body.

3. The combination, in a lawn rake having a box-like body portion open at the top and at one end, of a rake comb comprising a plurality of rods disposed in parallel relationship, a transversely extending angle member disposed beneath the floor of said body portion intermediate the ends thereof, one end of each rod being secured to said angle member, the opposite ends of said rods projecting forwardly of said body portion and having upwardly beveled ends, and means secured to the forward edge of said floor for supporting said rods in spaced relation intermediate their ends.

4. A lawn rake comprising a box-like body having an open end and an open top with a solid floor, the side walls of the body projecting forwardly beyond the forward edge of the floor, a plurality of rods extending forwardly from and slightly inclined upwardly relative to said floor between said side walls and supported beneath the floor rearwardly of said edge, wheels supporting the closed end of said body, and shoe means at the forward extremities of said side walls forwardly of said rods having rounded portions below the plane of the floor supporting said rods in a horizontal plane above the ground.

WILLIAM D. NELSON.